United States Patent
Spahr et al.

(10) Patent No.: US 9,010,875 B2
(45) Date of Patent: Apr. 21, 2015

(54) HUB FOR A BICYCLE

(75) Inventors: Stefan Spahr, Lengnau (CH); Thomas Gasser, Detlingen (CH)

(73) Assignee: DT Swiss Inc., Grand Junction, CO (US)

( * ) Notice: Subject to any disclaimer, the term of this patent is extended or adjusted under 35 U.S.C. 154(b) by 534 days.

(21) Appl. No.: 13/416,059

(22) Filed: Mar. 9, 2012

(65) Prior Publication Data

US 2012/0228922 A1  Sep. 13, 2012

(30) Foreign Application Priority Data

Mar. 10, 2011  (DE) .......................... 10 2011 013 536

(51) Int. Cl.
  *B60B 27/00* (2006.01)
  *B60B 27/04* (2006.01)

(52) U.S. Cl.
  CPC .......... *B60B 27/047* (2013.01); *B60Y 2200/13* (2013.01); *Y02T 10/86* (2013.01)

(58) Field of Classification Search
  CPC ...... B60B 27/02; B60B 27/023; B60B 27/04; B60B 27/047

USPC .................... 301/105.1, 110.5, 110.6; 192/64
See application file for complete search history.

(56) References Cited

U.S. PATENT DOCUMENTS

| | | | | |
|---|---|---|---|---|
| 3,170,549 A | * | 2/1965 | Baker, III | ................... 192/217.6 |
| 5,433,306 A | * | 7/1995 | Yang | ............................... 192/64 |
| 7,562,755 B2 | * | 7/2009 | Spahr | ............................. 192/64 |

FOREIGN PATENT DOCUMENTS

| | | | |
|---|---|---|---|
| CN | 201538196 U | * | 8/2010 |
| DE | 29 27 138 | | 1/1981 |
| DE | 2927138 A | * | 1/1981 |
| DE | 94 03 506 | | 6/1994 |

* cited by examiner

*Primary Examiner* — Kip T Kotter
*Assistant Examiner* — Jean Charleston
(74) *Attorney, Agent, or Firm* — Greer, Burns & Crain, Ltd.

(57) ABSTRACT

A hub with a hub body, the hub body having two end units and a tubular center part, and the center part being disposed between, and received at, the end units. At least one end unit includes a tubular inserting portion onto which the center part having a tubular slip-on portion is pushed. The inserting portion and the slip-on portion overlap in an overlapping region.

11 Claims, 5 Drawing Sheets

HUB FOR A BICYCLE

BACKGROUND

The present invention relates to a hub to be used in an at least partially muscle-powered two-wheeled vehicle and in particular a bicycle.

In the professional field of bicycle sportsmen and in the field of sports, an increasingly considerable weight is placed on lightweight though strong components. The lighter the components, the better the feasible acceleration, and higher maximum and average speeds can be achieved.

A significant component in weight reduction is the hubs employed which, on the one hand must withstand high and highest loads, while on the other hand they considerably contribute to the total weight.

Therefore, for reducing the total weight of a hub, hubs have become known in the prior art whose housings consist partially or entirely of a fibrous composite material. Since the hub sleeve connecting the two hub flanges considerably contributes to the weight of the hub, hubs have become known in which the hub sleeve between the spoke flanges consists of a fibrous composite material or another lightweight material. In the known hubs, the carbon sleeve is pushed into a receiving bore of the hub end pieces and glued in. To ensure reasonable gluing, a considerable gap is provided in the radial direction between the outer diameter of the carbon sleeve and the inner diameter of the receiving hole. This facilitates reasonable gluing.

There is the drawback, however, that the hub or spoke flanges are held at the hub sleeve by means of a considerable quantity of adhesive and that a considerable difference in diameters between the hub sleeve and the receiving opening in the hub end piece is required. This is why involved alignment of the individual parts is required in gluing to ensure the necessary concentricity. This results in an optically attractive and functional, composite hub.

The drawback of this is that considerable manual adjustments are required in manufacturing the hub, which further increases the manufacturing steps.

SUMMARY

It is therefore the object of the present invention to provide a multi-part hub having a low weight and requiring reduced adjustment efforts.

This object is solved by the present hub. Further advantages and features of the present hub can be taken from the general description and the description of an exemplary embodiment.

The hub according to the invention is in particular provided to be used with a two-wheeled vehicle, and in particular with a muscle-powered two-wheeled vehicle such as a bicycle. The hub according to the invention comprises a hub body which hub body comprises a pair of end units and at least one center part. When mounted, the center part is disposed between and received at the end units. At least one end unit comprises a tubular inserting portion onto which the center part having a tubular slip-on portion is pushed. The inserting portion and the slip-on portion overlap in an overlapping region. The overlapping region comprises a guiding portion and a gluing portion.

The hub according to the invention has many advantages, since it allows a simple construction and facilitates mounting. This allows a reduction in the manufacturing costs while at the same time reducing the total weight of the hub.

The configuration according to the invention is particularly advantageous since the overlapping region is not provided in its entirety as a gluing portion showing a considerable thickness of the applied adhesive, but a guiding portion is provided which considerably facilitates guiding and adjustment. The guiding portion permits assembly of the hub from its parts and to provide it with adhesive for gluing without requiring further adjustment using gauges.

Another considerable advantage consists in that finishing work is reduced and as a rule eliminated since there is no glue residue to be removed.

The center part is configured in particular hollow and preferably tubular. Its cross-section may be cylindrical, round or otherwise in shape.

In particular is the guiding portion provided with a diameter tolerance that is smaller between the inserting portion and the slip-on portion than at the gluing portion. It is for example possible for both the guiding portion and the gluing portion to be configured as cylindrical portions. Then the guiding portion shows smaller differences between the diameters of the slip-on portion and the inserting portion than in the gluing portion.

Or else it is possible that at the guiding portion, the slip-on portion and/or the inserting portion, by way of guiding teeth, elevations or depressions or the like, have locally different diameters so as to provide the two components pushed one into the other with a tolerance to radial displacement which at the guiding portion is considerably less than at the gluing portion.

In this way careful mounting renders superfluous the complicated use of gauges or master tools for precisely assembling the hub.

Preferably, the inserting portion has stepped outer diameters at the overlapping region and/or the slip-on portion has a constant inner diameter. For example, the inserting portion may have two different outer diameters at the overlapping region while the slip-on portion has a constant inner diameter. The larger outer diameter of the inserting portion is preferably precisely fitted to the constant inner diameter of the slip-on portion so as to achieve in the overlapping portion of the larger outer diameter with the constant inner diameter of the slip-on portion a considerably increased fitting accuracy, such that the guiding portion is realized.

When both ends of the center part are provided with these enlarged outer diameters at the inserting portion, then the entire hub will be held defined during mounting. The gluing portion provided with a reduced outer diameter of the inserting portion, however, allows the receipt of a sufficient quantity of the provided adhesive to allow a reliable and permanently secure retaining of the individual hub parts relative to one another.

The inserting portion and the slip-on portion show particularly preferred round and in particular cylindrical cross-sections. In variants it is also possible to provide oval or angular cross-sections.

In all of the configurations, it is particularly preferred for the difference in diameters in the gluing portion between the inner diameter of the slip-on portion and the outer diameter of the inserting portion to be between 0.2 percent and approximately 2 percent of the inner diameter of the slip-on portion. In a specific example for example, given a diameter of approximately 25 to 30 mm, the difference in diameters between the larger outer diameter region and the smaller outer diameter region may be between approximately 0.1 and 0.4 mm, although it may be larger or smaller. The precise dimensions also depend on the adhesive employed.

Advantageously, the axial width of the guiding portion is smaller than the axial width of the gluing portion. The axial width of the guiding portion may in preferred configurations be between about 1/10 and 1/2 of the entire width of the guiding portion and the gluing portion. In a concrete configuration the axial width of the guiding portion may for example be 2 mm while the axial width of the gluing portion is between 4 and 12 mm.

In all of the configurations, it is particularly preferred for the center part to consist of at least one fibrous composite material at least in part. Employing a wide variety of materials is possible and preferred. The center part may be of thermoplastic or duroplastic or other plastics which are in particular fiber-reinforced. Manufacturing is conceivable from one single or multiple layers of these fibrous composite materials.

In particular is the guiding portion disposed at an axial end of the overlapping region. Particularly preferably, the guiding portion is provided at an axial end of the center part when the hub is in an assembled state.

Particularly preferably, the guiding portion is provided axially farther outwardly than is the gluing portion. Or else it is possible for the guiding portion to be provided at the axially inner end of the overlapping region.

It is also possible and preferred for the slip-on portion to show stepped inner diameters at the overlapping region, and/or for the inserting portion to show a constant outer diameter. Given this configuration, the guiding portion is realized by way of a reduced inner diameter of the slip-on portion. In these configurations it is preferred for the guiding portion to be provided axially farther inwardly than the gluing portion to prevent the adhesive from being wiped off during mounting.

It is possible for the center part to receive at least one sleeve which is in particular configured metallic. By way of this hub, which may be wrapped into the fibrous composite material during manufacturing of the center part, a defined seat of the center part at the finished sleeve may be ensured since in manufacturing the center part the sleeve or sleeves can be incorporated in the center part well-defined.

Another hub according to the invention comprises a hub body which hub body comprises a pair of end units and at least one center part. The center part is disposed between and received at the end units. At least one end unit comprises a tubular slip-on portion into which the center part comprising a tubular inserting portion is pushed, wherein the inserting portion and the slip-on portion overlap in an overlapping region and in the overlapping region a guiding portion and a gluing portion are provided.

Such a hub is basically structured similarly to the hub indicated above. The inserting portion and the slip-on portion interact. By way of the guiding portion and the gluing portion, high mounting accuracy and the requisite adhesive strength are ensured. What is important is that two plug portions interact. One of the plug portions is configured as an inserting portion and the other, as a slip-on portion.

On the whole the invention provides an in particular glued hub body which is simple in structure and mounting and allows a reduced weight. Few mounting steps achieve high accuracy so as to ensure reproducible concentricity.

BRIEF DESCRIPTION OF THE DRAWINGS

Further advantages and features of the invention can be taken from the exemplary embodiment which will be described below with reference to the accompanying figures.

The Figures show in.

DETAILED DESCRIPTION

With reference to the accompanying FIGS. 1 to 12 exemplary embodiments of hubs 1 according to the invention will be explained by way of use with bicycles 100.

Figure 1:
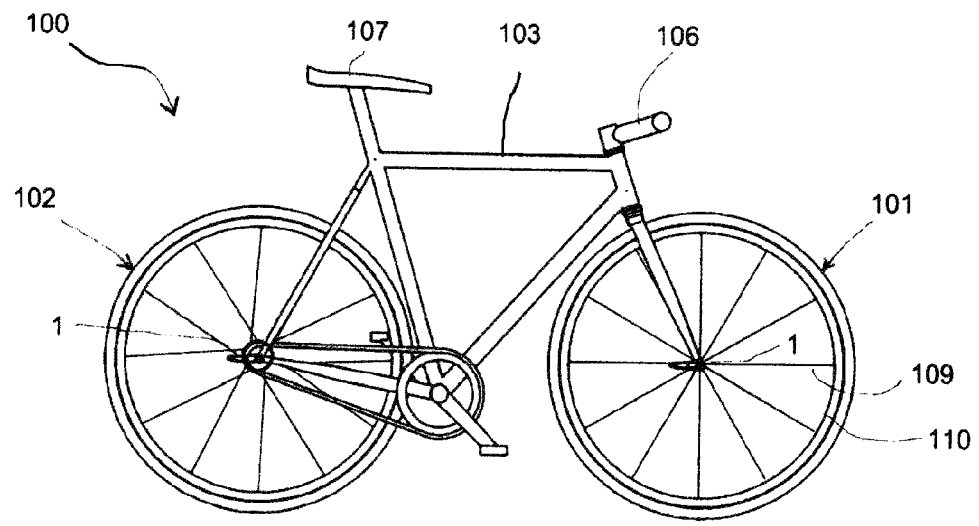
FIG. 1 a bicycle having hubs according to the invention.

FIG. 1 illustrates a bicycle 100 shown as a roadster or racing bicycle equipped with hubs 1 according to the invention. The bicycle 100 in FIG. 1 is provided with a front wheel 101 and a rear wheel 102 retained at a frame 103. Furthermore, a handlebar 106 and a saddle 107 are provided. The front wheel 101 and the rear wheel 102 are provided with a rim 110 each connected with the hub 1 by way of spokes 109. The front wheel 101 is presently provided with radial spokes while in the rear wheel at least part of the spokes are disposed at the hub at least in part tangentially to allow torque transmission.

Figure 2:
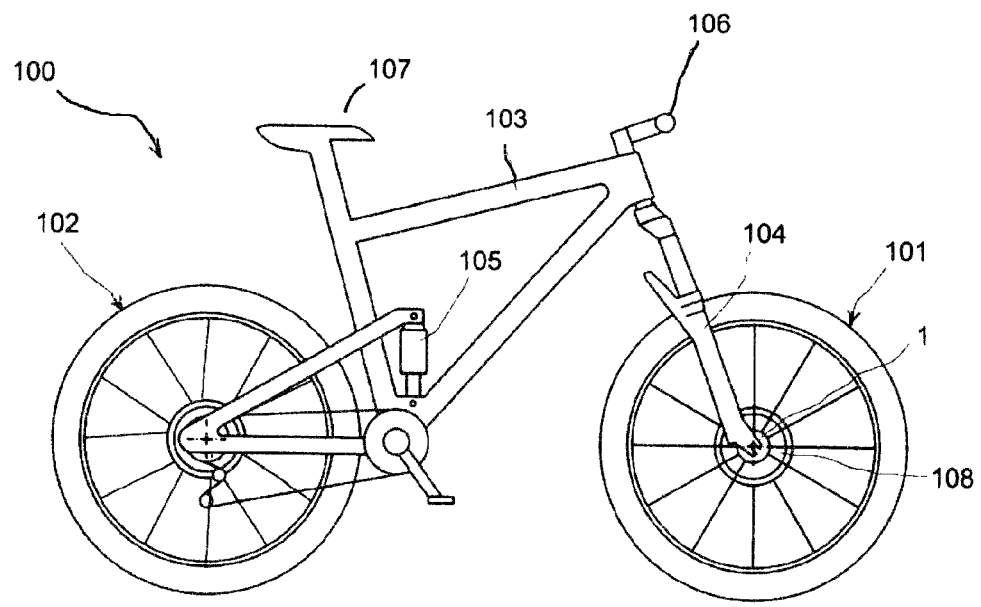
FIG. 2 another bicycle having hubs according to the invention.

FIG. 2 shows a schematic illustration of a mountain bike as the bicycle 100 which is again provided with a front wheel 101 and a rear wheel 102. The front wheel is retained sprung at a suspension fork 104 while a damper 105 is provided for damping the rear wheel. A disk brake 108 serves for effectively braking the bicycle 100.

Figure 3:
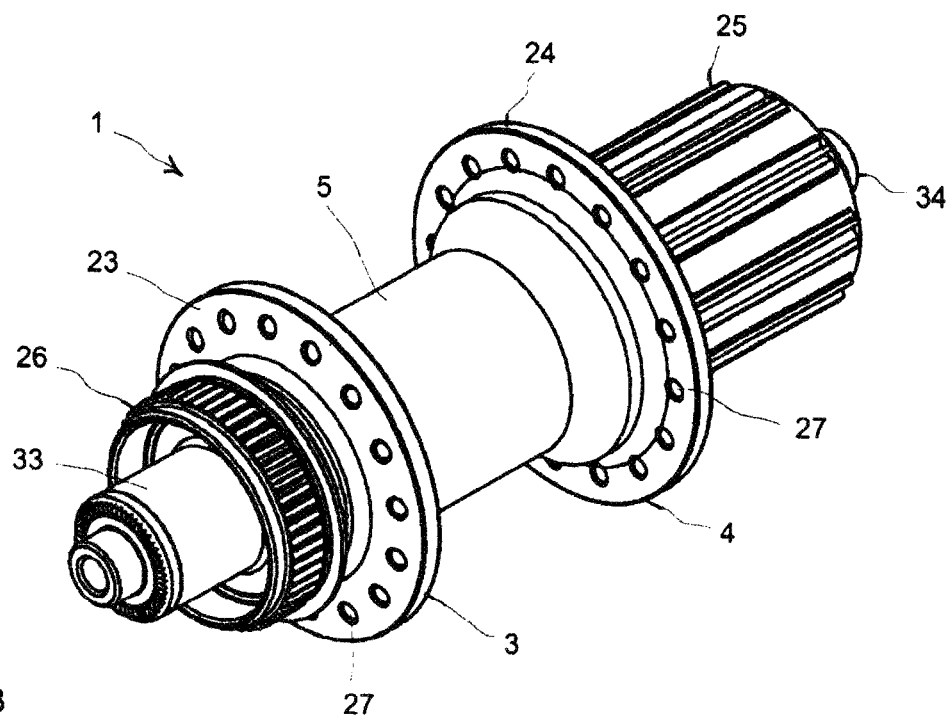
FIG. 3 a perspective view of a rear wheel hub according to the invention.

FIG. 3 shows a perspective view of a hub 1 according to the invention configured as a rear wheel hub e.g. for the bicycle 100 according to FIG. 1 or FIG. 2. The hub 1 comprises a center part 5 as the hub sleeve with the hub sleeve 5 being fastened to a pair of end units 3 and 4. The end units 3 and 4 comprise hub flanges 23 and 24 respectively, provided with spoke holes 27 for connecting the hub 1 via spokes 109 to a rim 110. In the present exemplary embodiment the axial ends of the hub 1 are provided with adapter members 33 and 34 with which the hub 1 is fastened to the dropouts of the frame 103. The disk brake carrier 26 serves for fastening a disk brake 108.

Figure 4:
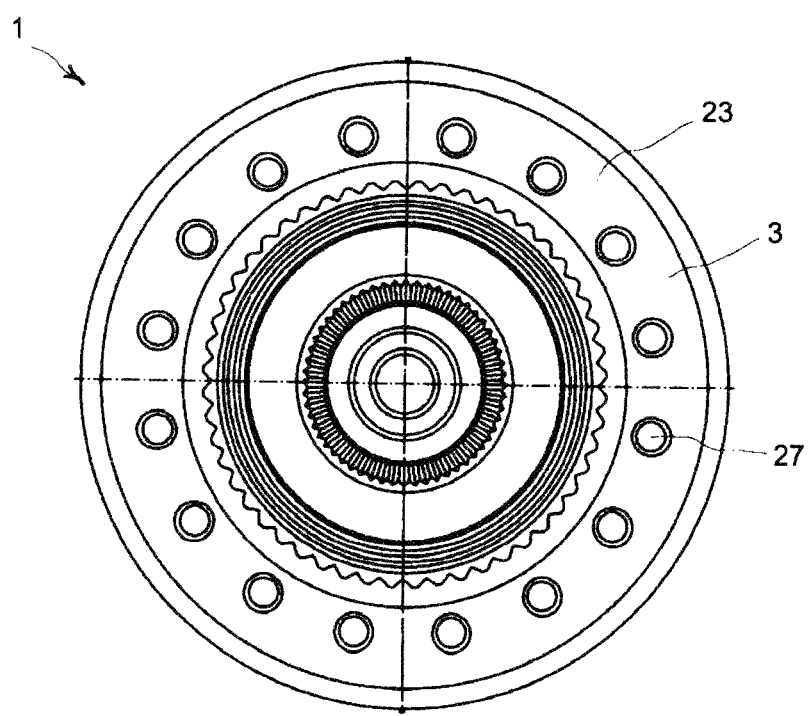
FIG. 4 a side view of the hub according to FIG. 3.

FIG. 4 shows a side view of the hub according to FIG. 3 with the hub flange 23 recognizable at the end unit 3 with the spoke holes 27.

Figure 5:
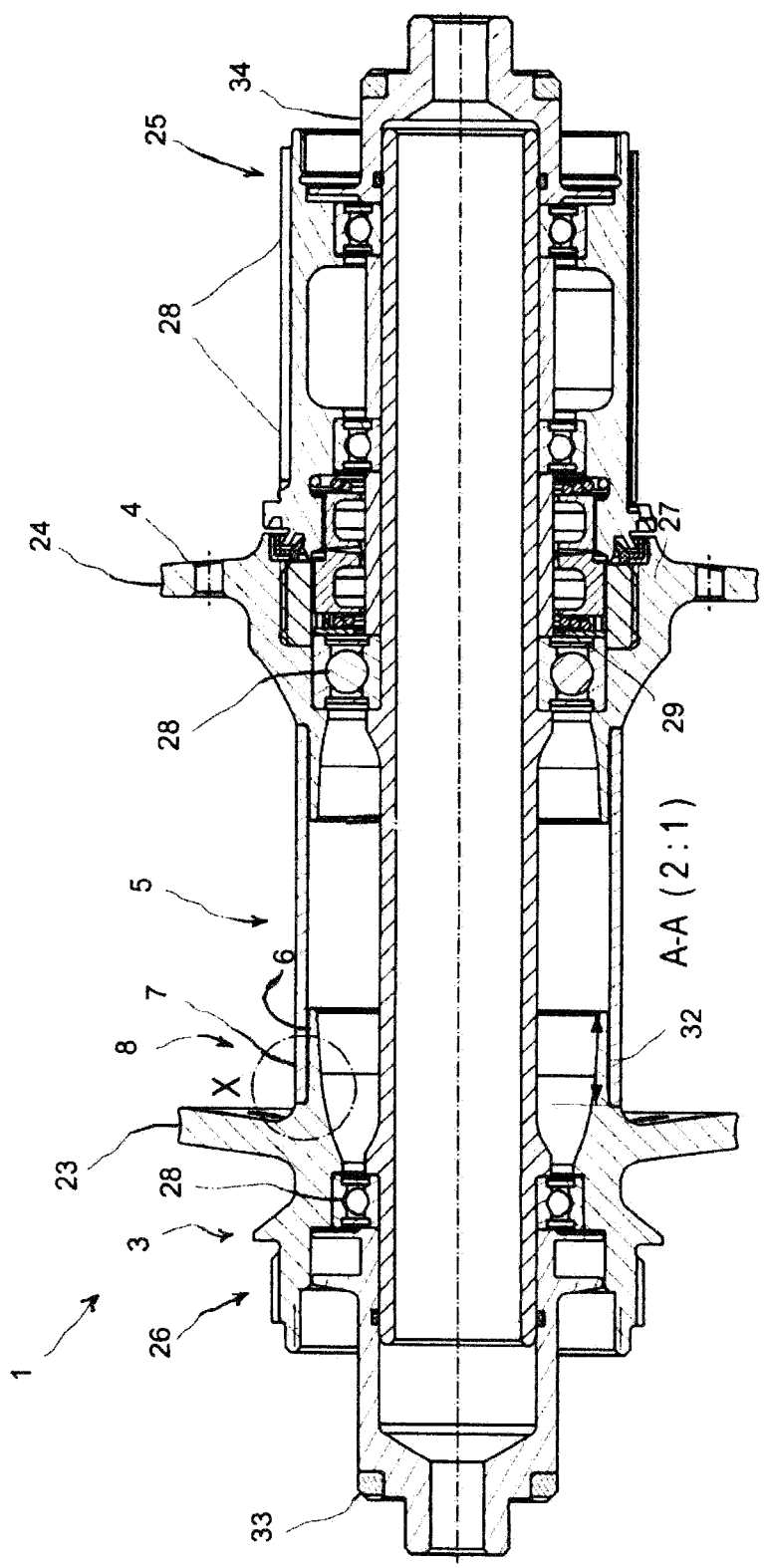
FIG. 5 a cross-section of the hub according to FIG. 3.

FIG. 5 shows a cross-section of the hub 1. The hub sleeve or the center part 5 presently consists of a fibrous composite material, forming a lightweight though high-strength connection between the end units 3 and 4 of the hub 1.

At the end units 3 and 4 the hub 1 is received via bearings 28 to be rotatable relative to the axle 30 configured as a hollow axle. While the hollow axle 30 may consist of a metal alloy and in particular a light metal, it may consist of at least one or multiple fibrous composite materials.

The end units 3 and 4 preferably consist at least substantially of a light metal alloy although they may in part or entirely consist of a fibrous composite material.

One of the axial ends of the hub 1 at which the adapter member 34 is provided has disposed at it the rotor 25 serving to receive one or multiple sprockets.

The present structure of the hub 1 according to the invention is such that the components employed as supports are provided at the end units 3 and 4 such that the hub sleeve, being the center part 5, serves as a lightweight though strong spacer.

For fastening the center part 5 at the end units 3 and 4 both of the axial ends of the center part 5 are provided with an overlapping region 8 each at which inserting portions 6 of the end units 3 and 4 interact with slip-on portions 7 of the hub sleeve 5. For mounting the inserting portion 6 of an end unit 3, 4 is inserted into the slip-on portion 7 of the hub sleeve after applying a one-, two-, or multi-component adhesive onto the inserting portion or into the slip-on portion to ensure a permanently secure connection of the hub sleeve 5 with the respective end unit 3 or 4.

In the present exemplary embodiment, the freewheel provided is a toothed-disk freewheel 29 providing secure operation via a pair of toothed disks having end teeth.

Figure 6:
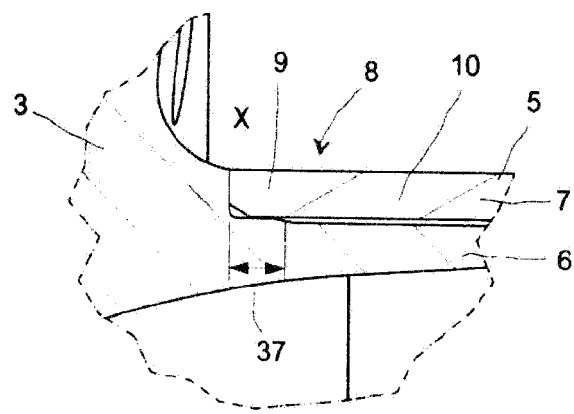
FIG. 6 the detail X from FIG. 5 in an enlarged illustration.

FIG. 6 illustrates an enlarged illustration of the detail "X" from FIG. 5 showing part of the overlapping region 8 with the center part 5 and the end unit 3 in cross-section. It is clearly recognizable that the overlapping region 8 is provided with a guiding portion 9 and a gluing portion 10 with the fitting accuracy of the inserting portion 6 and the slip-on portion 7 in the guiding portion 9 being considerably larger than in the gluing portion 10. In the gluing portion 10 a defined, radial gap is provided between the inserting portion 6 and the slip-on portion 7. The gap ensures the defined application of an adhesive layer so as to ensure a permanently secure seat of the center part 5 at the end unit 3.

It is a considerable advantage of the construction that the gluing region 10 provided axially further inwardly ensures a reliable adhesive connection between the center part 5 and the end units 3 and 4 while the guiding portion 9 or the guiding portions 9 provided at the two ends 35, 36 of the center part 5 attain a defined seat during mounting such that complicated adjusting while gluing the individual housing parts can be dispensed with.

Figure 7:
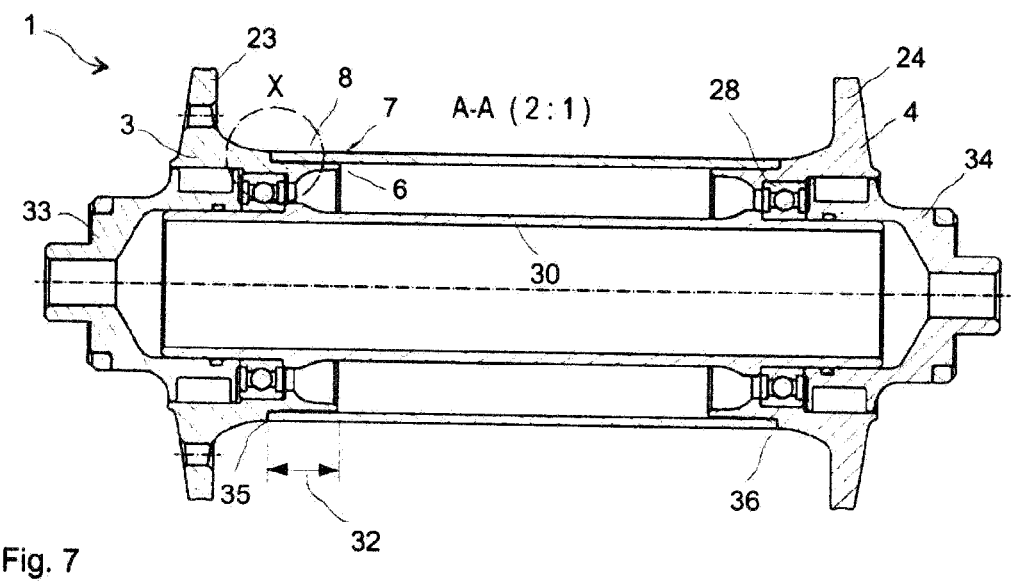
FIG. 7 a front wheel hub according to the invention.

FIG. 7 shows a front wheel hub as the hub 1 according to the invention in cross-section. The hub 1 is provided with end units 3 and 4 and a center part 5 disposed therebetween. The end unit 3 is provided with the hub flange 23 and the end unit 4, with the hub flange 24. Adapter members 33 and 34 follow the two ends of the end units 3 and 4 to ensure accommodation of the front wheel hub 1 in a fork or suspension fork 104.

Both of the axial ends 35, 36 of the center part 5 are provided with overlapping regions 8 where an inserting portion 6 each protrudes into the slip-on portions 7 of the hub sleeve 5. At both of the two axial ends 35 and 36 of the center part 5 the respective overlapping region 8 extends across an axial width 32 that is composed of the axial width 37 of the guiding portion 9 and the axial width 38 of the gluing portion 10.

Figure 8:
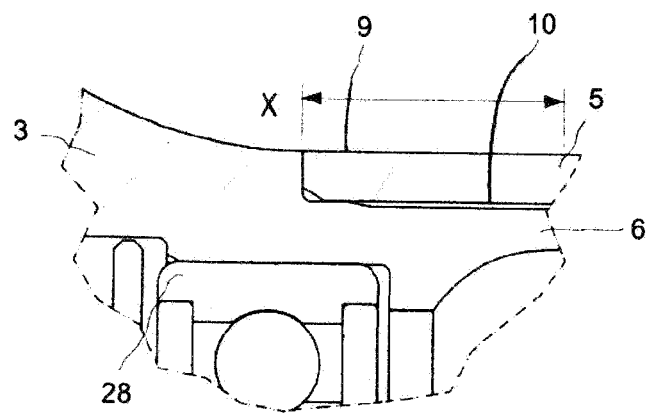
FIG. 8 the detail X from FIG. 7.

FIG. 8 shows the greatly enlarged detail "X" from FIG. 7. One can also recognize the bearing 28 at the end unit 3. The guiding portion 9 extends across an axial width 37 and the gluing portion 10 extends across an axial width 38 which combined form the axial width 32. While the axial width 37 of the guiding portion 9 is presently approximately 2 mm, the axial width of the gluing portion 10 in the illustrated exemplary embodiment may be between approximately 5 and 10 mm. This ensures a secure gluing connection.

The FIGS. 9 through 12 show different variants of how to connect an end unit 3 or 4 with a center part 5.

Figure 9:
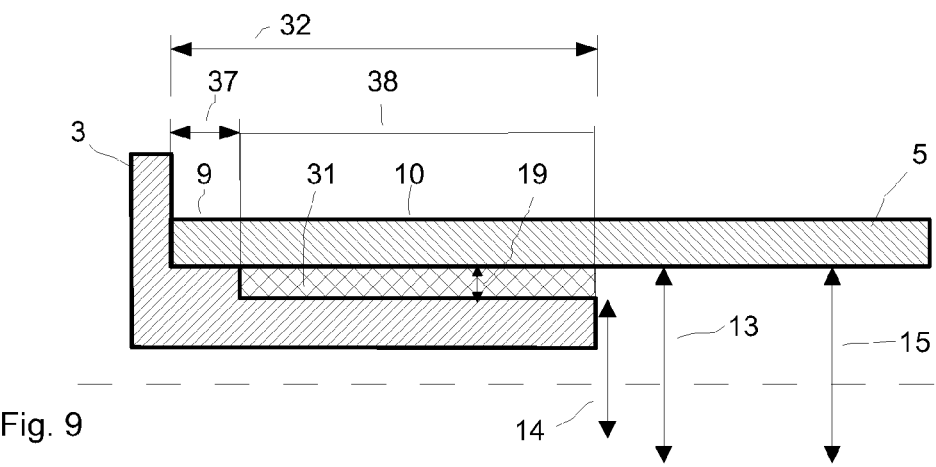
FIG. 9 a schematic, sectional illustration of the overlapping region of a hub according to the invention.

FIG. 9 shows a schematic illustration of the basic connection type according to the FIGS. 6 and 8. One can clearly recognize that the inserting portion 6 of the end unit 3 is provided with two different diameter regions 13 and 14. At the guiding portion 9, the inserting portion 6 has an outer diameter 13 that is larger than the smaller outer diameter 14 of the inserting portion 6. Presently, the inner diameter 15 of the center part 5 is constant across the overlapping region 8. Presently, the inner diameter 15 of the center part 5 is preferably constant over its entire length. FIG. 9 also shows the adhesive layer 31 in the gluing portion 10.

Figure 10:
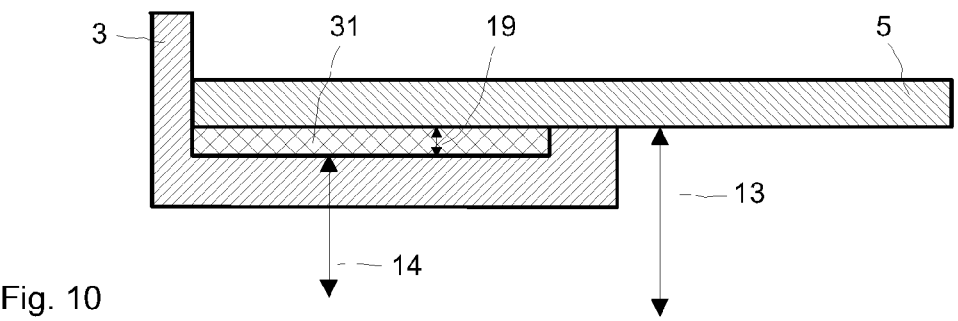
FIG. 10 a schematic, sectional illustration of another overlapping region.

FIG. 10 shows a variant in which again two diameter portions having different outer diameters 13 and 14 are provided at the inserting portion 6 of the end unit 3 or 4 respectively. Unlike the configuration according to FIG. 9, the enlarged outer diameter 13 region is presently not provided at the axially outwardly end of the overlapping region 8 but at the axially inwardly end of the overlapping region 8.

The configuration according to FIG. 9 shows the advantage over the variant according to FIG. 10 that the distances of the guiding portions 9 at both the ends of the center part 5 are larger such that employing reduced working steps the same precision can be obtained as in the configuration according to FIG. 10.

Figure 11:
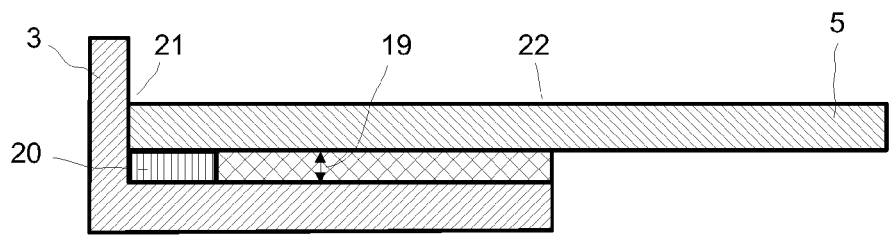
FIG. 11 a schematic illustration of a third overlapping region.

FIG. 11 illustrates another variant in which the inserting portion 6 of the end unit 3 has a constant outer diameter 18. The slip-on portion 7 of the center part 5 presently shows a reduced inner diameter 17 at the guiding portion 9. The reduced inner diameter 17 is presently realized by a sleeve 20 which may for example be configured as a metallic sleeve. The sleeve 20 may be glued into the interior of the center part 5 although it may be incorporated directly when manufacturing the center part 5. Preferably, the sleeve 20 is disposed at the axially outwardly end as is illustrated in FIG. 11. Or else it is possible to dispose the sleeve 20 axially inwardly so as to obtain a structure as in FIG. 10.

Figure 12:
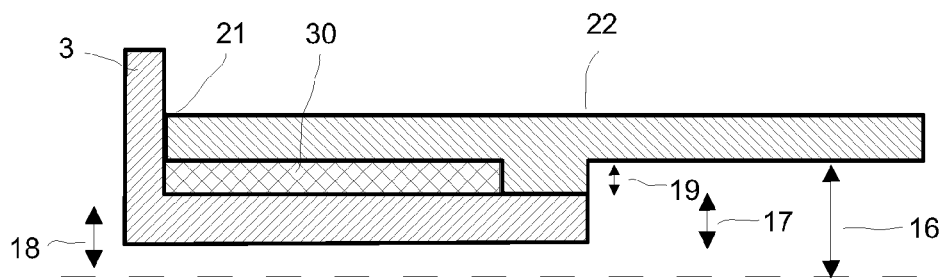
FIG. 12 a schematic illustration of a fourth overlapping region.

FIG. 12 shows a variant in which the slip-on portion has two diameter regions 15 and 16. In this case, the reduced inner diameter 17 region is integrally manufactured with the hub sleeve 5.

FIG. 12 also shows the diameter difference 19 which is also present in the exemplary embodiments according to the other figures. Preferably, the difference in diameters is approximately 0.1 to 0.3 and preferably approximately 0.2 mm.

What is also possible is a hub structure in which at least on one side the center part is pushed into an end piece but not slipped on. In this case two plug portions are provided. One inserting portion is provided at one end of the center part and the hub body or the end unit is configured with a slip-on portion.

Both of the axial ends of the center part may be configured identical or different in all of the configurations.

In all of the cases a pair of plug portions interact, one of which is configured as an inserting portion and one, as a slip-on portion. These are provided with a guiding portion and a gluing portion.

On the whole the invention provides an advantageous hub which combines high stability with a low weight. Manufacturing is simple and the overlapping region of the inserting and the slip-on portions and the guiding portion allow the achievement of particularly great ease of mounting and precision.

The invention claimed is:

1. A hub comprising:
   a hub body;
   the hub body including two end units and at least one center part;

the center part is disposed between and received at the end units; and at least one end unit comprises a tubular inserting portion onto which the center part comprising a tubular slip-on portion is pushed, wherein the inserting portion and the slip-on portion overlap in an overlapping region and a guiding portion and a gluing portion are provided in the overlapping region, wherein the guiding portion is provided with a diameter tolerance that is lower between the inserting portion and the slip-on portion than at the gluing portion.

2. The hub according to claim 1 wherein the inserting portion has stepped outer diameters at the overlapping region and wherein the slip-on portion has a constant inner diameter.

3. The hub according to claim 1 wherein the inserting portion and the slip-on portion are round in cross-section.

4. The hub according to claim 2 wherein a diameter difference between an inner diameter of the slip-on portion and an outer diameter of the inserting portion in the gluing portion is between 0.2% and 1.5% of the inner diameter of the slip-on portion.

5. The hub according to claim 1 wherein an axial width of the guiding portion is smaller than an axial width of the gluing portion.

6. The hub according to claim 1 wherein the center part consists at least in part of at least one fibrous composite material.

7. The hub according to claim 1 wherein the guiding portion is disposed at an axial end of the overlapping region.

8. The hub according to claim 1 wherein the guiding portion is provided at an axial end of the center part.

9. The hub according to claim 1 wherein the guiding portion is provided axially farther outwardly than the gluing portion.

10. The hub according to claim 1 wherein the slip-on portion has stepped inner diameters at the overlapping region and wherein the inserting portion has a constant outer diameter.

11. A hub comprising:

a hub body;

the hub body including two end units and at least one center part;

the center part is disposed between and received at the end units;

at least one end unit comprises a tubular inserting portion onto which the center part comprising a tubular slip-on portion is pushed, wherein the inserting portion and the slip-on portion overlap in an overlapping region and a guiding portion and a gluing portion are provided in the overlapping region; and at least one metallic sleeve received at the center part.

* * * * *